United States Patent [19]

Osada et al.

[11] Patent Number: 5,087,997
[45] Date of Patent: Feb. 11, 1992

[54] POSITION CONTROL SYSTEM FOR READ/WRITE DEVICE

[75] Inventors: Yutaka Osada, Fujisawa; Keiichi Kaneko, Yokohama, both of Japan

[73] Assignee: Victor Company of Japan, Ltd., Yokohama, Japan

[21] Appl. No.: 324,136

[22] Filed: Mar. 16, 1989

[30] Foreign Application Priority Data

Mar. 17, 1988 [JP] Japan .................. 63-64295

[51] Int. Cl.⁵ .............. G11B 5/55; G11B 21/08; G11B 21/10
[52] U.S. Cl. .................. 360/78.06; 360/77.04; 360/77.02; 360/78.11; 369/32; 369/44.29
[58] Field of Search ............ 360/77.02–77.11, 360/78.04–78.13; 369/44.25, 44.27, 44.29, 44.34, 44.26, 32, 33, 41, 43, 44.28, 44.29, 44.31, 44.32, 44.35, 44.36

[56] References Cited

U.S. PATENT DOCUMENTS

| | | | |
|---|---|---|---|
| 3,881,184 | 4/1975 | Koepcke et al. | 360/77.04 |
| 4,536,809 | 8/1985 | Sidman | 360/77.04 |
| 4,788,608 | 11/1988 | Tsujisawa | 360/77.04 |

FOREIGN PATENT DOCUMENTS

56-148770 11/1981 Japan .
58-41577 9/1983 Japan .
59-8172 1/1984 Japan .

*Primary Examiner*—Aristotelis Psitos
*Assistant Examiner*—Steven R. Garland
*Attorney, Agent, or Firm*—Fleit, Jacobson, Cohn, Price, Holman & Stern

[57] ABSTRACT

A position control system for a read/write device for fast positioning the read/write device at a particular track of a disk having a tracking pattern in the recording medium. The system having a transportation unit for transporting the read/write device to a target track and a control loop containing a BAF (multi-peak bandpass filter), includes a position control unit for controlling the position of the read/write device so as for the read/write device to track the target track, and a storage unit for storing the internal variables of the BAF filter. When the operation by the transportation unit is switched to the operation of the position control unit, the operation of the BAF filter is performed in accordance with the internal values or initial values stored beforehand, a particular one of the variables stored beforehand is used for the operation by the position control unit, or a reference value of the speed control is adjusted in accordance with a particular one of the variables stored beforehand.

3 Claims, 12 Drawing Sheets

POSITION CONTROL SYSTEM FOR READ/WRITE DEVICE

BACKGROUND OF THE INVENTION

1. Field of the Invention

The present invention relates to a position control system capable of fast positioning a read/write device to a particular track position of a recording medium such as a disk having therein a tracking pattern.

2. Description of the Related Art

A magnetic recording/reproducing system for magnetically reading/writing an information signal has been used in various technical fields because reading/writing an information signal from/to the magnetic recording medium is easily performed. As the demands for higher density recording/reproducing become greater, the track pitch has been made narrower. With the narrower track pitch, it is difficult for a magnetic head to trace the track. Various tracking methods have been proposed to solve the above problem. For instance, widely adopted in the art is to record signals or patterns in a magnetic disk for tracking control.

One example of such tracking control patterns is optical patterns which are recorded beforehand in a magnetic floppy disk as the tracking control information. By reading such optical patterns, the magnetic head can reliably be tracked at a particular narrow track under the tracking control operation.

Such optical patterns for tracking purposes have been formed heretofore on the surface of or within the magnetic recording medium layer of a floppy disk. Various types of examples of a magnetic head capable of reading the tracking information, writing/reading the data information signal to/from a magnetic disk are disclosed, e.g., in Japanese Patent Publication No. 58-41577, Japanese Patent Laid-open Publications Nos. 56-148770, 59-8172.

Figure 3A:
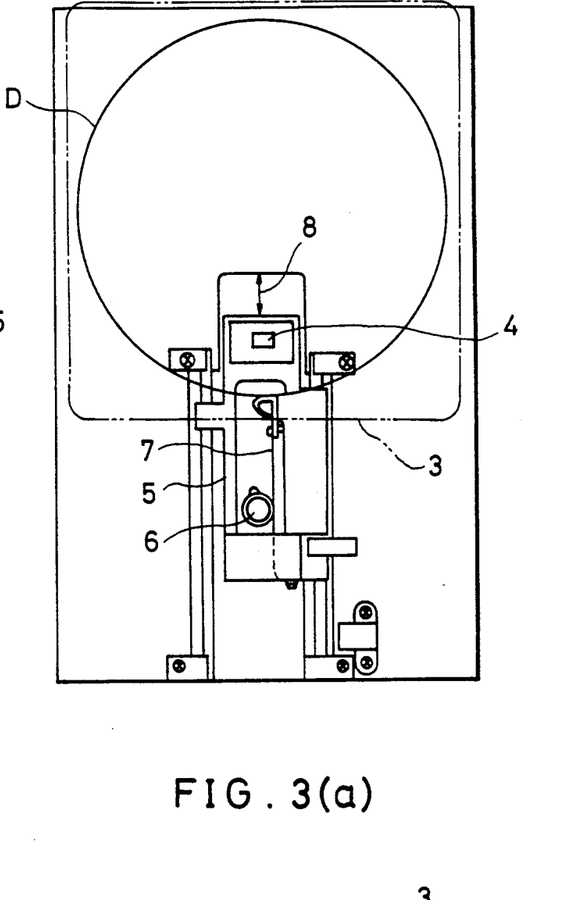
FIGS. 3(a) to 3(c) are plan, left side elevational, and bottom side elevational views showing an example of the structure of a magnetic recording/reproducing apparatus.
Figure 3B:
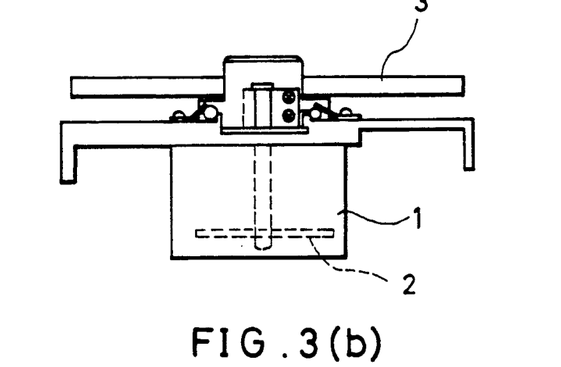
Figure 3C:
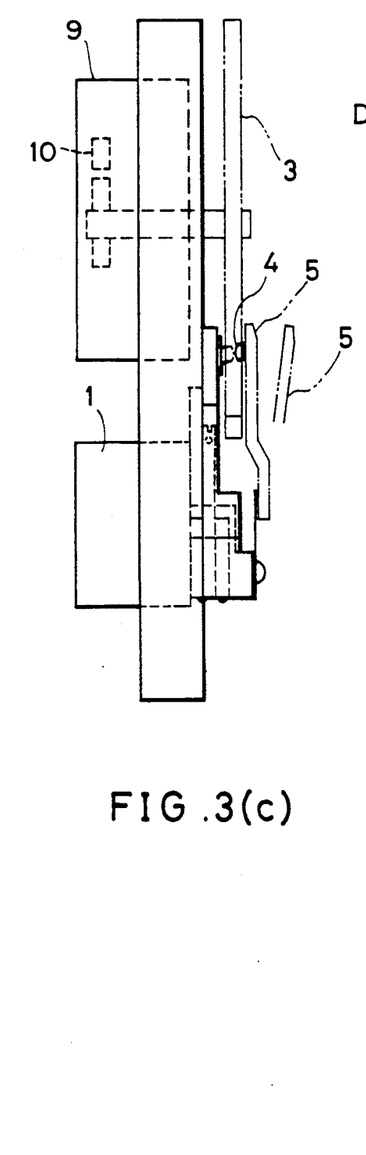

FIGS. 3(a) to 3(c) are plan, front, and side views, respectively showing the main part of a magnetic recording/reproducing apparatus which uses a magnetic floppy disk with optical patterns to read/write information while detecting the optical patterns.

Referring to FIGS. 3(a) to 3(c), the apparatus comprises a motor 1, rotary encoder 2, a cassette 3 for housing therein a magnetic floppy disk D, a read/write device 4 which is mounted on a carriage 5 on which components for reading the tracking optical patterns are also mounted, such as, a pulley 6, a steel belt 7 and a disk drive motor 9.

As the motor 1 rotates, the carriage 5 moves in the direction indicated by an arrow 8 because one end of the steel belt 7 is wound around the pulley 6 which is fixedly coupled to the motor 1 shaft and the other end of the steel belt 7 is fixed at the carriage 5. The motor 1, pulley 6, steel belt 7 and carriage constitute an actuator for the read/write device 4.

The carriage 5 and hence read/write device 4 is caused by a controller to move in the direction indicated by the arrow 8, i.e., in the radial direction of a magnetic floppy disk during a seek mode operation. The controller measures a distance to a target track based on a given target address and an address read from the track, and controls to move the read/write device at a speed corresponding to the measured distance (this control is conducted within the range indicated as speed control in FIG. 11).

Figure 11:
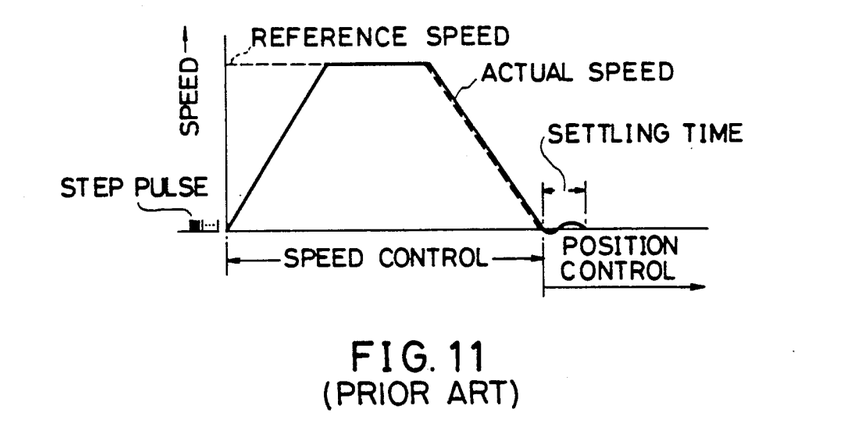
FIG. 11 shows the speed control characteristics used in explaining the control operation of the present invention.

In a position control mode (tracking control mode), the control is conducted within the range indicated as position control in FIG. 11. This tracking control is carried out in accordance with a signal output from an optical pickup device for picking up the tracking optical pattern, to thus allow reliable tracking control. The optical pickup device is mounted facing the part of the above-described components mounted on the carriage 5. An example of the pickup element for tracking an optical pattern is disclosed, e.g., in U.S. Pat. application Ser. No. 259,706 filed on Oct. 19, 1988, now U.S. Pat. No. 4,987,505.

Figure 9:
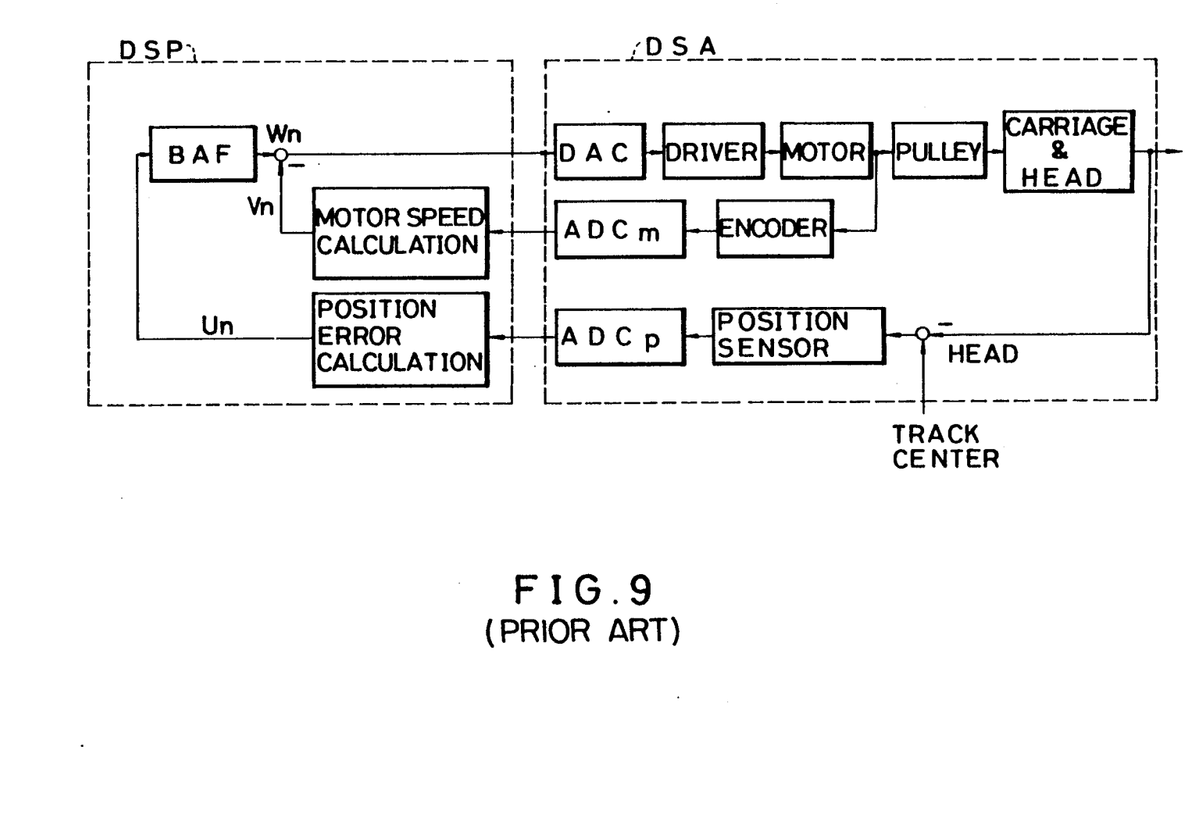
FIG. 9 is a block diagram showing a conventional tracking servo system.
Figure 10:
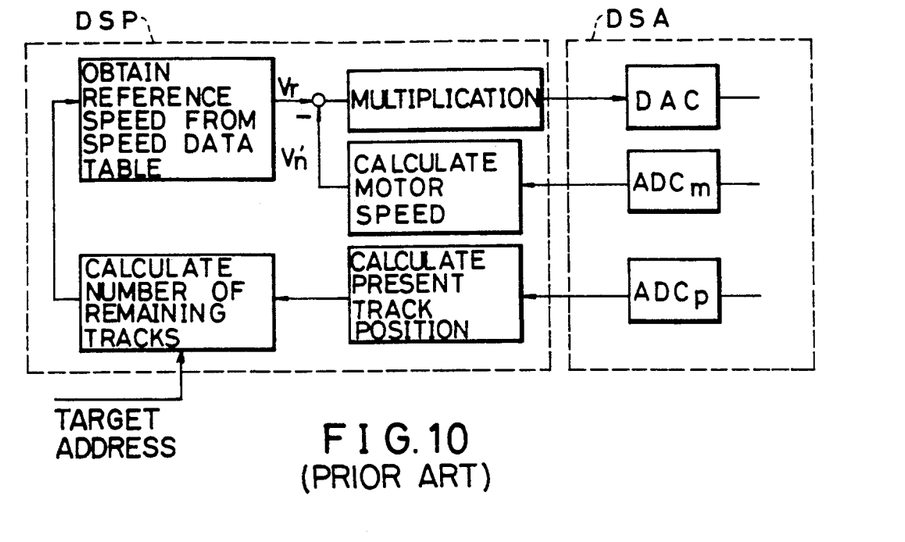
FIG. 10 is a block diagram showing a conventional seek servo system.

FIG. 10 is a fundamental block diagram showing the servo system used during the seek mode operation corresponding to the speed control shown in FIG. 11. FIG. 9 is a fundamental block diagram showing the servo system used during the position control or tracking control mode operation corresponding to the position control shown in FIG. 11.

Referring to FIGS. 9 and 10, both the servo systems are constructed of a digital signal processor DSP, e.g., MN 1901 type manufactured by Matsushita Electric Industrial Co., Ltd., and a carriage drive section the DSA. Digital signals from the DSA are processed in the DSP and the processed result is supplied to the DSA for control of the read/write device. A multi-peak bandpass filter BAF shown in the DSP of FIG. 9 is used as a band amplification filter. As the main functions of both the servo systems, pulse transfer functions of elementary constituent blocks and computational equations performed in the DSP are shown in Table 1. The structural arrangements of DSAs in FIGS. 9 and 10 are the same so that a fraction thereof is omitted in FIG. 10.

Expansion and contraction caused by temperature variation of polyester base material of a magnetic floppy disk is anisotropic so that a track run-out frequency of an eccentric disk has a frequency component f and 2f, f being an inverse of a revolution period Td of the disk. The band amplification filter BAF is provided so as to make a residual off-track sufficiently small over the range of two frequencies f and 2f.

TABLE 1

Pulse transfer function of BAF
$$w(z)/u(z) = (a1+a2z^{-1}+a3z^{-2})/(1-a4z^{-1}-a5z^{-2}) \times (b1+b2z^{-1}+b3z^{-2})/(1-b4z^{-1}-b5z^{-2}) = \{w'(z)/u(z)\}\{w(z)/w'(z)\}$$
Pulse transfer function of speed feedback
$$v(z)/x(z) = c1(1-z^{-1})$$
Pulse transfer function of speed detection
$$v'(z)/x(z) = d1(1-z^{-1})$$
Computational equations by BAF in DSP
$$w'n = a1un+a2u(n-1)+a3u(n-2)+a4w''(n-1)+a5w'(n-2)$$
$$wn = b1w'n+b2w'(n-1)+b3w'(n-2)+b4w(n-1)+b5w(n-2)$$
Computational equation by speed feedback in DSP
$$vn = c1\{xn-x(n-1)\}$$
Computational equation by speed detection (for seek) in DSP
$$v'n = d1\{xn-x(n-1)\}$$

The internal variations un, w'n, wn and vn shown in Table 1 change with a rotational phase of the disk during the steady state. During the steady state, the absolute speed of the track run-out can be detected based on the value vn because the residual off-track is very small during the steady state. Also, the track run-out speed can be detected based on the value wn because the value (wn−vn) is very small relative to the value vn.

Figure 12:
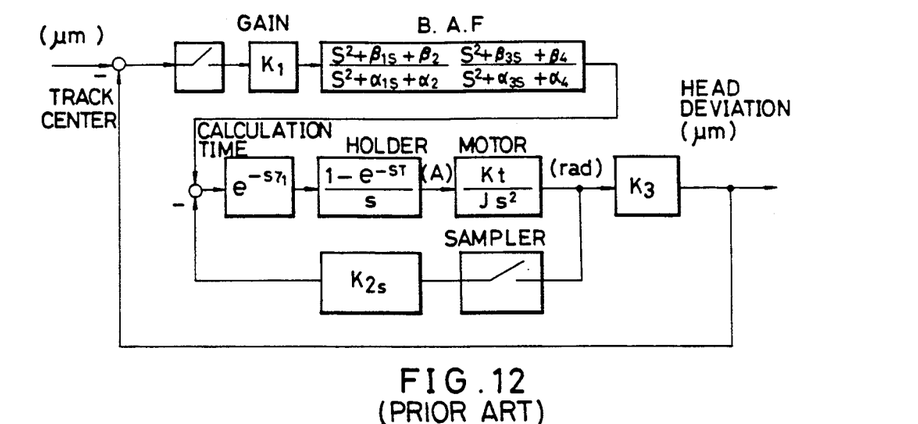
FIG. 12 is a block diagram analyzing the tracking servo system shown in FIG. 9.
Figures 13A, 13B:
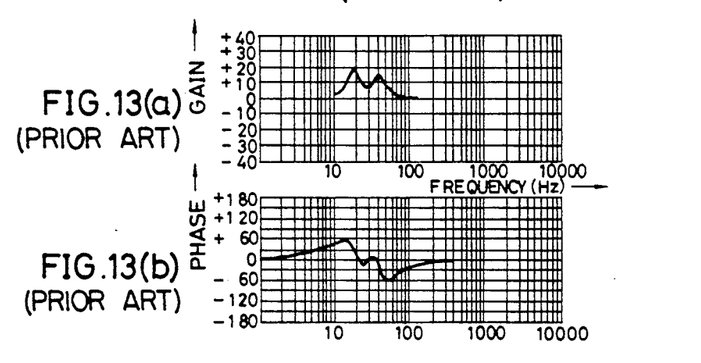
FIGS. 13(a) and 13(b) show the Bode diagram for BAF of FIG. 1.
Figure 14:
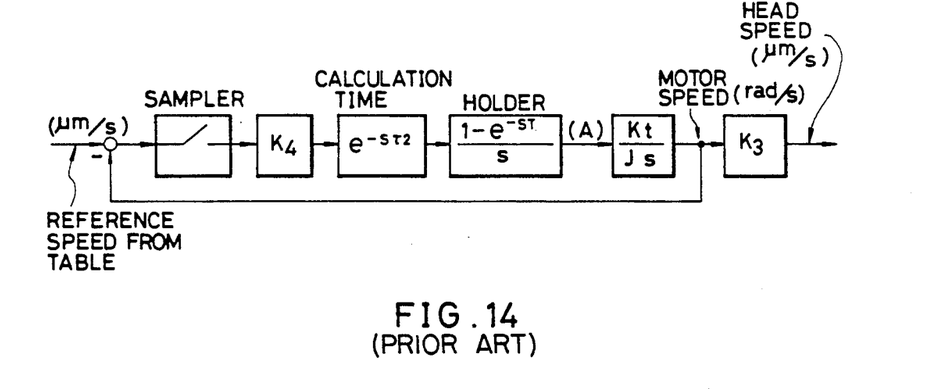
FIG. 14 is a block diagram analyzing the seek servo system shown in FIG. 10.

The analysis (including linear approximation) of the block diagram of FIG. 9 for the position control (tracking control) mode operation corresponding to the position control shown in FIG. 11 is shown in FIG. 12, whereas the similar analysis of the block diagram of FIG. 10 for the seek mode operation corresponding to the speed control shown in FIG. 11 is shown in FIG. 14. FIGS. 13(a) and 13(b) are Bode diagrams for BAF.

In the representations used in FIGS. 12 and 14, J denotes an inertia (g.cm.sec$^2$) of a motor and carriage, kt a torque constant (g.cm/A), k3 a radius (micron/rad) of a pulley, k1 a forward gain, k2 a speed feedback gain, T a sampling period (sec), $\tau$1 and $\tau$2 a delay time (sec) caused by computation, and k4 a gain.

With the conventional position control system for a read/write device as described above with FIGS. 9 to 14, the following problems arise. Namely, it takes a long time to change from the seek mode to the position control mode if the center of a track moves swingingly about the read/write device, or an overshoot of the read/write device may occur in the width direction of a track at the time of switching from the seek mode to the position control mode (refer to FIG. 15). The problem of such long access time and unstable settling has been long desired to be solved.

SUMMARY OF THE INVENTION

It is therefore an object of the present invention to provide a position control system for a read/write device capable of smoothly changing from a seek mode operation to a position control mode operation.

It is another object of the present invention to provide a position control system for a read/write device which allows rapid and stable settling of the read/write device.

To achieve the above objects, according to one aspect of the present invention, a position control system for a read/write device for positioning the read/write device at a particular track of a disk having a tracking pattern in the recording medium, said system having transportation means for transporting the read/write device to a target track and a control loop containing a filter whose gain is adapted to be set at a predetermined value at a plurality of frequencies, comprises:

position control means for controlling the position of said read/write device so as for said read/write device to track the target track;

means for switching between said transportation means and said position control means;

means for detecting a rotational phase of the disk;

means for storing the internal variables of said filter with the rotational phase of the disk, the internal variables being obtained during one rotation of said disk while correctly positioning said read/write device at a specific track within a predetermined area of said disk; and means for starting the operation of said filter, after said transportation means is switched to said position control means, by using as the initial value of said filter said internal variables stored in said storage means.

According to a second aspect of the present invention, a position control system for a read/write device for positioning the read/write device at a particular track of a disk having a tracking pattern in the recording medium, said system having transportation means for transporting the read/write device to a target track and a control loop containing a filter whose gain is adapted to be set at a predetermined value at a plurality of frequencies, comprises:

position control means for controlling the position of said read/write device so as for said read/write device to track a target track;

means for switching between said transportation means and said position control means;

means for storing the internal variables of said filter in accordance with the values obtained during one rotation of said disk while correctly positioning said read/write device at a specific track within a predetermined area of said disk; and means for adding, after said transportation means is switched to said position control means, a particular one of the variables stored in said storage means to said position control means.

According to a third aspect of the present invention, a position control system for a read/write device for positioning the read/write device at a particular track of a disk having a tracking pattern in the recording medium, comprises:

an actuator having means for detecting a speed of said read/write device;

speed control means for making the speed detected by said speed detecting means to follow a reference speed;

position control means for controlling the position of said read/write device so as for said read/write device to track a target track;

means for switching between said transportation means and said position control means;

means for storing the speed variation data of said read/write device relative to said disk, said speed variation being obtained during one rotation of said disk while correctly positioning said read/write device at a specific track within a predetermined area of said disk; and means for adjusting a reference speed used in speed control by using said speed variation data stored in said storage means.

DETAILED DESCRIPTION OF THE PREFERRED EMBODIMENT

Figure 1:
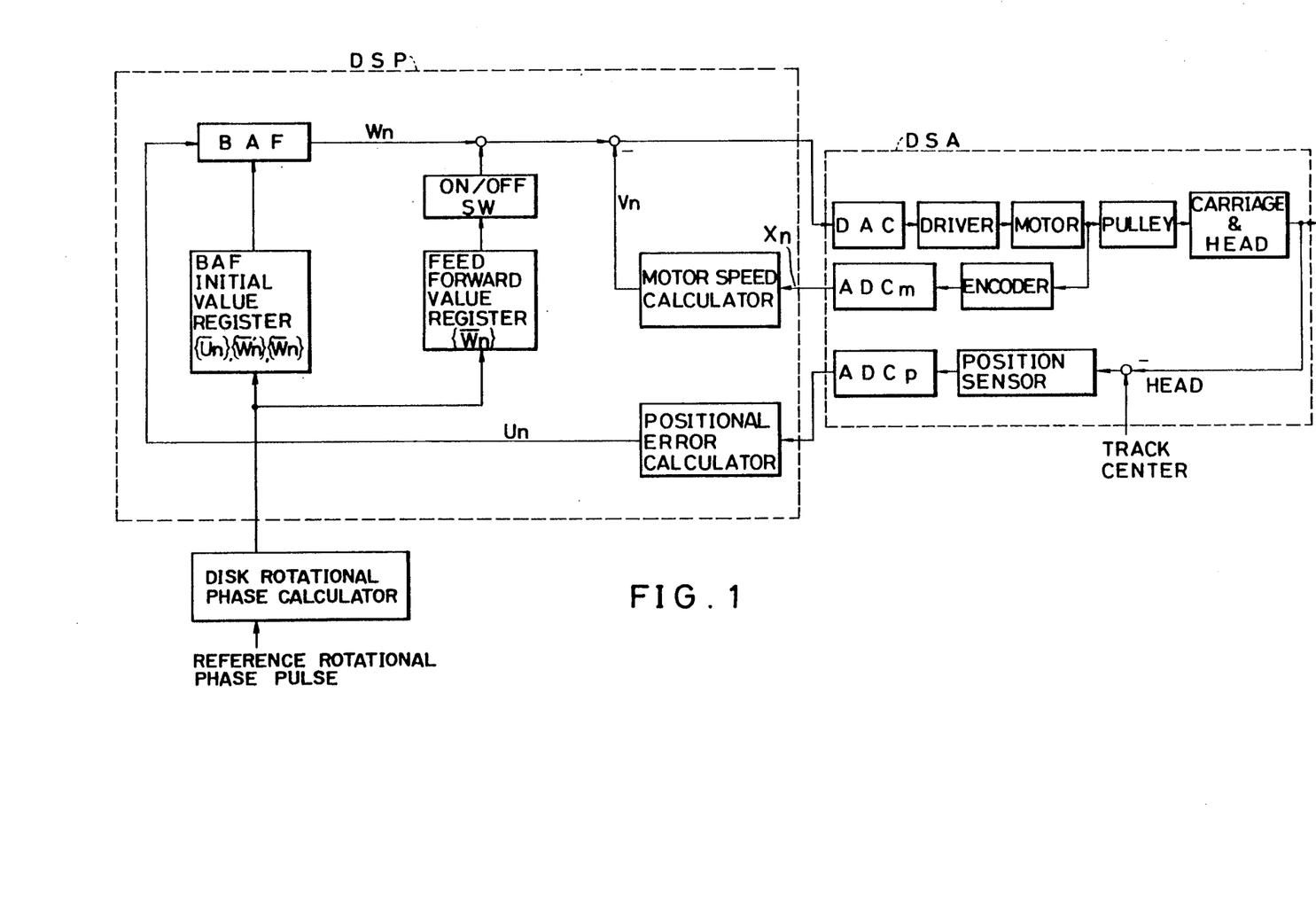
FIG. 1 is a block diagram showing an example of a tracking servo system of the position control system for a read/write device according to the present invention.
Figure 2:
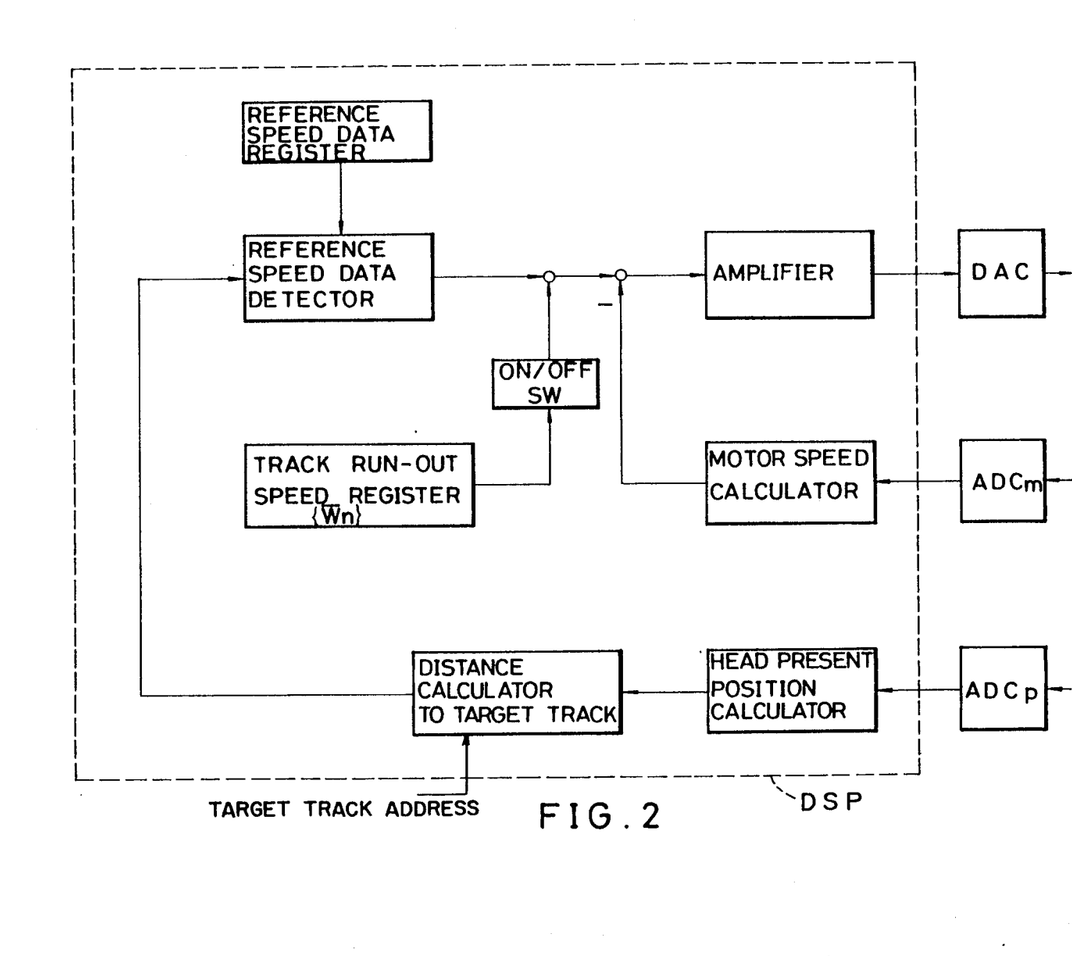
FIG. 2 is a block diagram showing an example of a seek servo system of the position control system for a read/write device according to the present invention.

FIGS. 1 and 2 show the fundamental block diagrams of the tracking servo system and seek servo system, respectively of the position control system for a read/write device according to the present invention. As previously described, the main operating functions of both the servo systems are to calculate the pulse transfer functions and the equations at digital signal processors DSP, as shown in Table 1. The structural arrangements of carriage drive sections DSAs in FIGS. 1 and 2 are the same so that a fraction thereof is omitted in FIG. 2.

Figure 6:
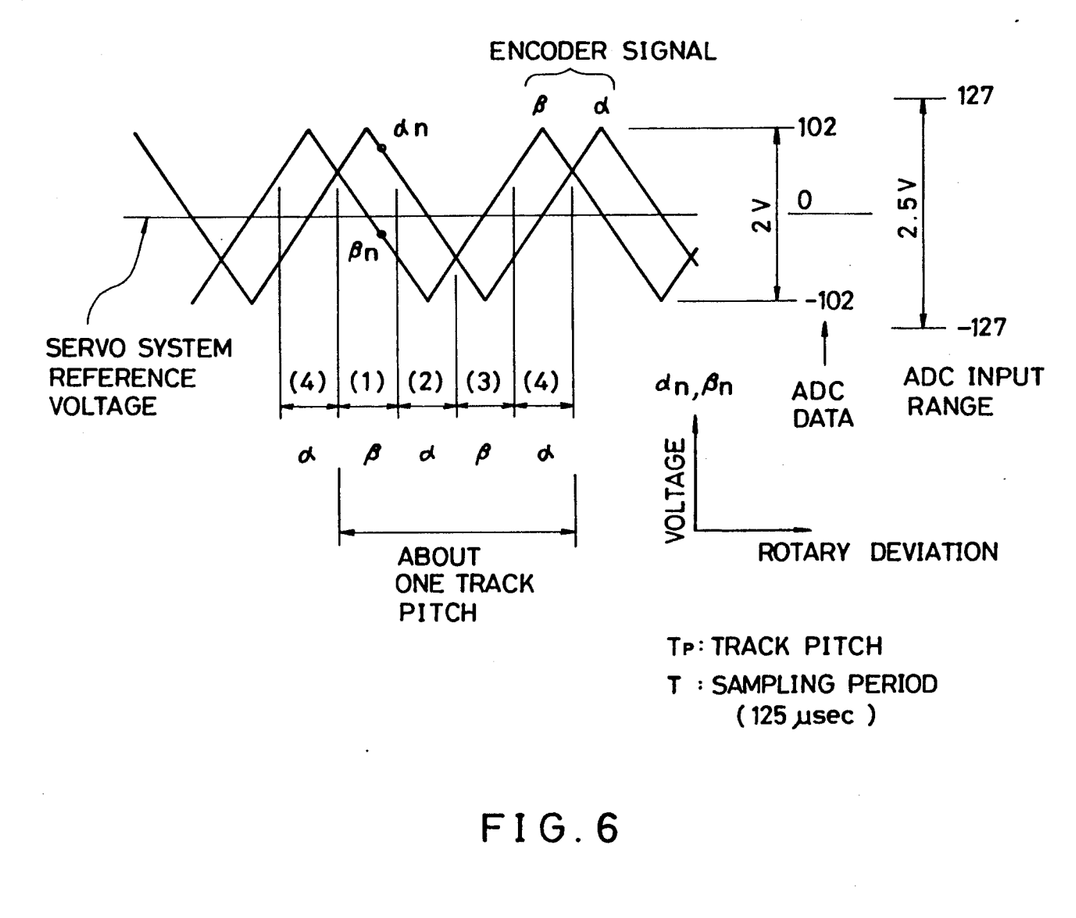
FIG. 6 illustrates how the motor speed is calculated in DSP shown in FIG. 1.

FIG. 6 illustrates how the motor speed is calculated at the motor speed calculator shown in DSPs in FIGS. 1 and 2. The motor speed is obtained based on two signals $\alpha$ and $\beta$ of quasi triangular waveform from an encoder having a phase difference of 90 degrees as shown in FIG. 6. The relationship between the encoder signals and the corresponding digital levels converted at analog/digital converters ADCm is as shown in FIG. 6.

DSP first detects the digital levels $\alpha n$ and $\beta n$ for the two analog signals $\alpha$ and $\beta$ outputted from ADCm to determine the region among four regions of one period of the encoder signal. Namely, the four regions are divided into:

(1) $\alpha n > \beta n$ and $\alpha n > -\beta n$
(2) $\alpha n > \beta n$ and $\alpha n \leq -\beta n$
(3) $\alpha n \leq \beta n$ and $\alpha n < -\beta n$
(4) $\alpha n \leq \beta n$ and $\alpha n \geq -\beta n$ DSP determines one of the above four regions and thereafter, selects a signal having a better linearity, i.e.,
selects $\beta$ for the case of (1),
selects $\alpha$ for the case of (2),
selects $\beta$ for the case of (3), and
selects $\alpha$ for the case of (4)
to thereby identify a particular digital level. The motor speed is then calculated based on a difference between the digital levels obtained at the preceding sampling and present sampling. If one or more periods of the encoder pass during the sampling period, then such a difference cannot be used in calculating the motor speed. However, even at the maximum speed during the seek mode operation, the read/write device moves only 0.66 track during the sampling period so that the motor speed can be correctly calculated.

Figure 7:
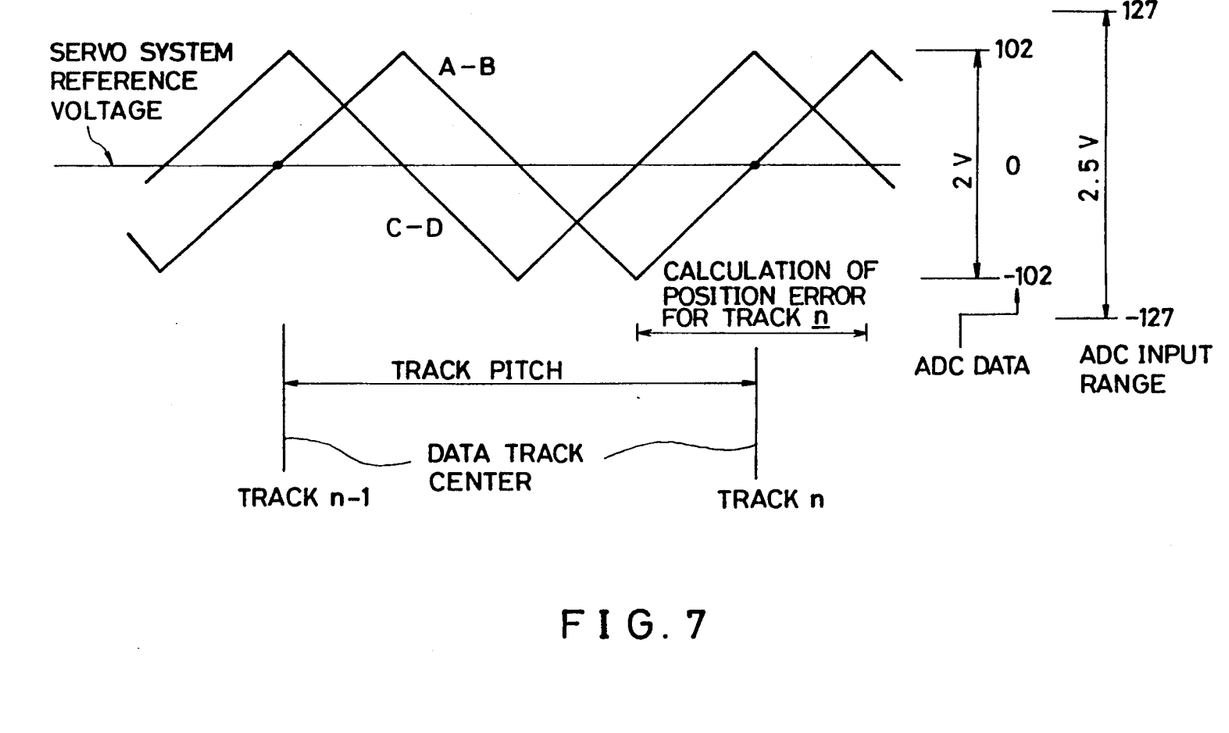
FIG. 7 illustrates how the position error is calculated.

FIG. 7 shows how the position error is calculated by the position error calculator of DSP shown in FIGS. 1 and 2. This position error calculation is conducted by the position control system whereby the position of a read/write device or magnetic head is determined at the region between two points which satisfies the conditions that the (A-B) signal from the photosensors acts as a servo reference voltage within the region where (C-D) signal is larger than the servo reference voltage, as shown in FIG. 7.

The photosensors obtaining signals A and B respectively are disposed apart each other by $(2n+1)P/2$, and the photosensors obtaining signals C and D respectively are also disposed apart each other by $(2n+1)P/2$, wherein n is an integer and P is a track pitch of the optical pattern of the disk. In addition, the distance between the photosensors obtaining the signals A and C respectively is $(2m+1)P/4$, wherein m is an integer.

For calculating the position error which is a deviation of the head position from the data track center, first it is confirmed whether or not the head is positioned within the region where the signal (C-D) is larger than the servo reference voltage (The position control system to be used after the seek servo system is designed such that the head is always positioned within the region where the signal (C-D) is larger than the servo reference voltage). Then, the voltage level of signal (A-B) is taken out from ADCp so that the position error can be calculated based on this voltage level.

The above position error calculation method is generally adopted in the fields of position control.

Figure 8:
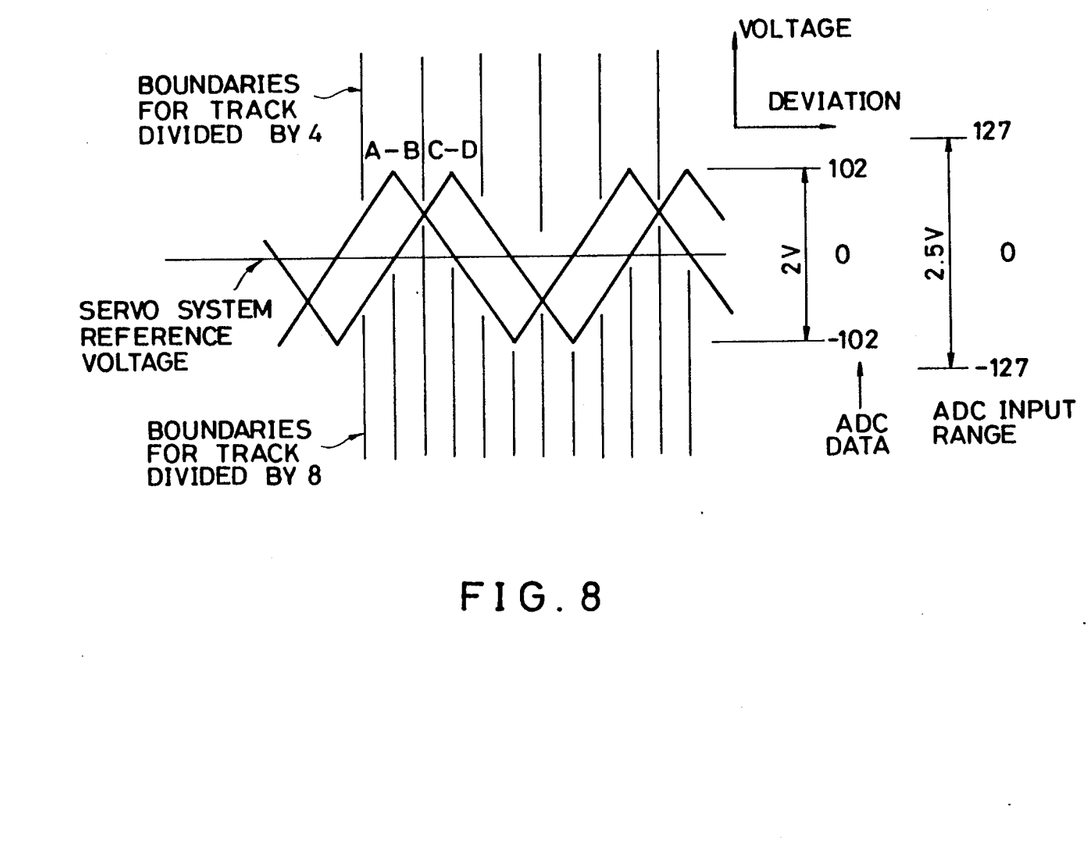
FIG. 8 illustrates how the present track position and the distance to the target track position is calculated.

FIG. 8 illustrates how the present track position and the distance to the target track position are calculated by the head present position calculator and distance calculator to the target track, shown in FIG. 2. The seek servo control will be briefly described in the following.

For the seek servo control or speed control, reference speed data are stored beforehand in a ROM (or reference speed data register shown in FIG. 2) in the form of table in correspondence with the distances to the target track. The distance to the target track is calculated during the seek servo mode operation, and the reference speed data detector shown in FIG. 2 reads from the table a reference speed value corresponding to the calculated distance to use it as the reference speed. The reference speed data are provided in correspondence with the number of divisions of a distance to the target track. Therefore, the reference speeds change stepwise with the distance to the target track so that the speed control is performed stepwise and not continuously. A high control precision (tracking precision to a reference speed) is required near the target track to make the settling time short. Therefore, in this embodiment, the speed data table with a resolution of $\frac{1}{4}$ track pitch is used for the distance of 5 tracks or more from the target track, whereas the table with a resolution of $\frac{1}{8}$ track pitch, i.e., two times as high as $\frac{1}{4}$, is used for the distance of shorter than 5 tracks pitch.

As seen from FIG. 8 showing the relationship between (A-B) and (C-D) signals from photosensors and the corresponding voltage levels outputted from ADCp, the divisions of the distance to the target track is divided at the points of:
(1) zero cross points of (A-B) and (D-D) signals
(2) points at (A-B)=(C-D)
(3) points at (A-B)=-(C-D)
The divisions of one track by 4 and 8 are illustrated in FIG. 8.

The present track position of the read/write device is calculated by first obtaining a distance between the positions at the present and preceding sampling times, and adding the obtained distance to the position at the preceding sampling time, based on two-phase signals (A-B) and (C-D), similar to the calculation method based on the output signals from the encoder described above.

The distance to the target track is calculated by subtracting the present track position from the target track position. The above methods of calculating the present track position and the distance to the target track are generally adopted for a hard disk apparatus.

As described previously, expansion and contraction caused by temperature variation of polyester base material of a magnetic floppy disk is anisotropic so that a track run-out frequency of an eccentric disk has a frequency component f and 2f, f being an inverse of a revolution period Td of the disk. The band amplification filter BAF is provided therefore to make a residual off-track sufficiently small over the range of two frequencies f and 2f.

FIGS. 3(a) to 3(c) are plan, front, and side views showing the main part of a magnetic recording/reproducing apparatus which uses a magnetic floppy disk with optical patterns to read/write an information while detecting the optical patterns.

As described previously, in FIGS. 3(a) to 3(c), the apparatus comprises a motor 1, rotary encoder 2, a cassette 3 for housing therein a magnetic floppy disk D, a read/write device 4 which is mounted on a carriage 5 and includes a magnetic head and photosensors for reading the tracking optical patterns is also mounted, a pulley 6, a steel belt 7 and a disk drive motor 9. The apparatus according to the present invention further comprises a reference rotational phase detector 10 for the disk drive motor 9.

As described previously, as the motor 1 rotates, the carriage 5 moves in the direction indicated by an arrow 8 because one end of the steel belt 7 is wound around the pulley 6 which is fixedly coupled to the motor 1 shaft and the other end of the steel belt 7 is fixed at the carriage 5. The motor 1, pulley 6, steel belt 7 and carriage constitute an actuator for the read/write device 4.

The carriage 5 and hence read/write device 4 is caused by a controller to move in the direction indicated by the arrow 8, i.e., in the radial direction of a magnetic floppy disk during a seek mode operation. The controller measures a distance to a target track based on a given target address and an address read from the track, and controls to move the read/write device at a speed corresponding to the measured distance (this control is conducted within the range indicated as speed control in FIG. 4). According to the position control system for a read/write device of this invention, upon turning on a power, the read/write device 4 is moved substantially to the middle of the recording/-reproducing area of a magnetic floppy disk in its radial direction. And after making the feed forward disabled and the disk drive not ready, the values un, w'n, and wn at the steady state of the disk during one rotation as shown in Table 1 are stored in the registers (RAM tables) shown in FIGS. 1 and 2 with a rotational phase of the disk. The rotational phase of the disk is obtained by a disk rotational phase calculator made of a counter which is reset by a reference phase pulse from the reference rotational phase detector 10 and counts the sampling clocks.

As described previously, the internal variables un, w'n, and wn shown in Table 1 changes with the rotational phase of the disk during the steady state. During the steady state, the absolute speed of the track run-out can be detected based on the value vn because the residual off-track is very small during the steady state. Also, the track run-out speed can be detected based on the value wn because the value (wn−vn) is very small relative to the value vn.

Figure 4:
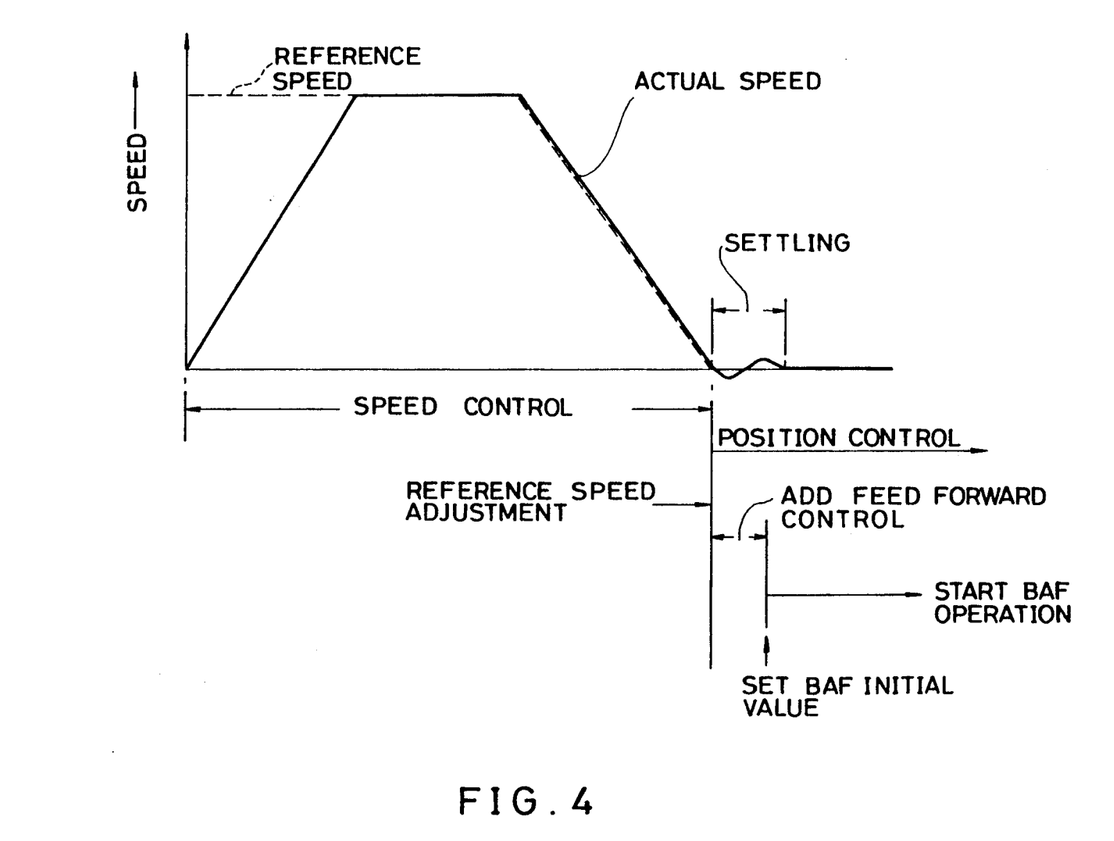
FIG. 4 illustrates the speed control characteristics during a position control for a read/write device.

After storing the internal values un, w'n, and wn, the disk drive is made ready to start the seek mode operation so that the read/write device 4 is driven while taking a reference speed value as indicated in the speed control area in FIG. 4.

Just before the seek mode is switched to the position control (tracking control) mode, the switch SW in DSP of FIG. 2 is turned on to thereby adjust the reference speed by the amount corresponding to the track run-out obtained based on the value wn stored in the RAM table in accordance with the rotational phase of the disk. Such speed adjustment makes constant the relative speed between the track and the read/write device at the time when the seek mode is switched to the position control (tracking control) mode.

For a short time (e.g., 2 ms) immediately after switching to the position control mode, the data wn in the RAM table shown in FIG. 1 are outputted as a feed forward signal so that the overshoot at the time of settling is reduced without being influenced by the track run-out.

After a lapse of the above short time (e.g., 2 ms), the feed forward is made inactive to start operating the band amplifier filter BAF using as the initial values thereof the values un, w'n, and wn stored in the RAM table in accordance with the rotational phase of the disk. Therefore, the time required for BAF to become a steady state, i.e., a position control steady state, is shortened.

It is to be understood that a reference rotational phase of a magnetic floppy disk is used as a reference in reading a proper set of the values un, w'n and wn.

With the above methods, the position control (tracking control) mode shown in FIG. 4 can be smoothly started while reliably, and rapidly tracing the target track.

Figure 5:
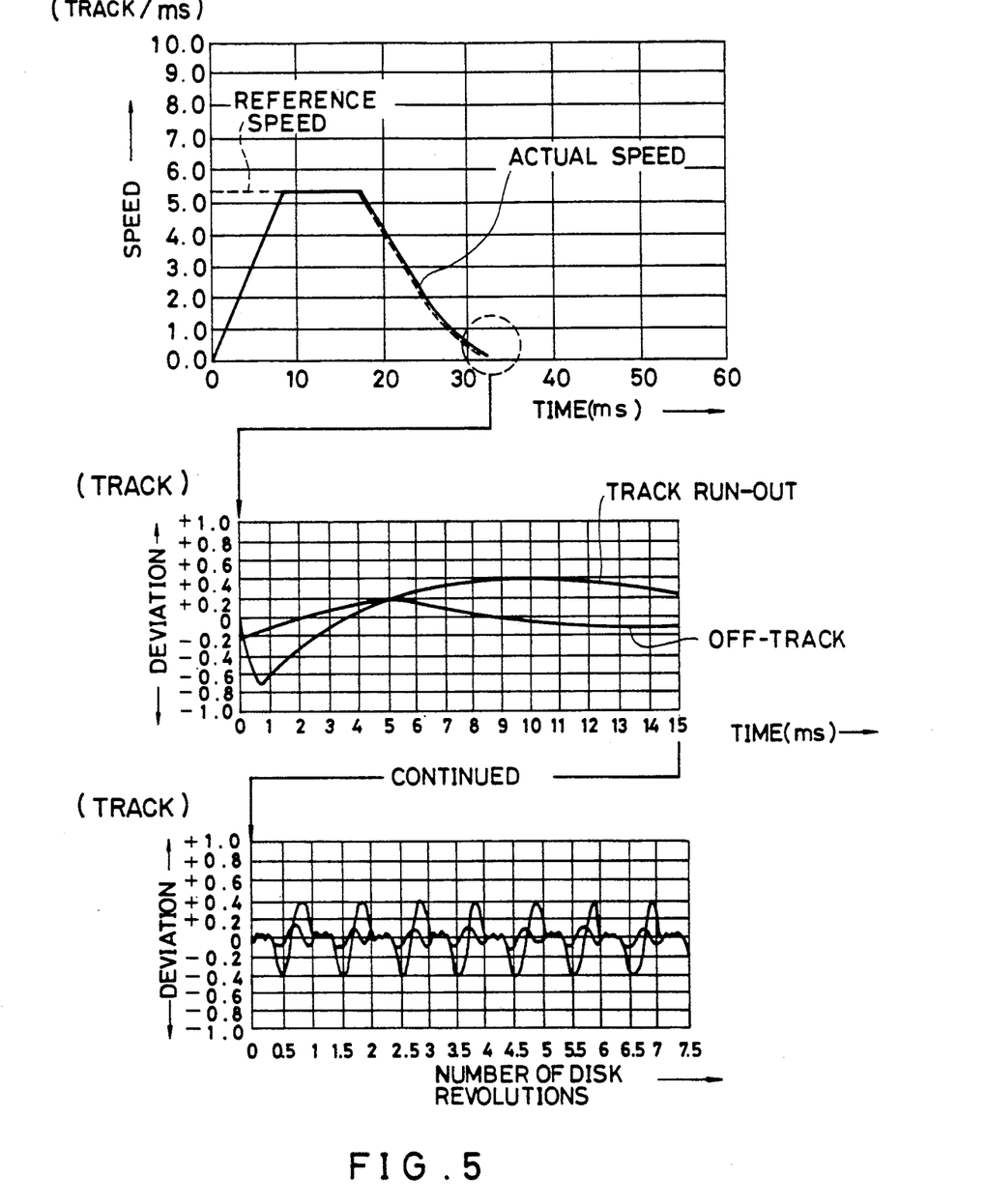
FIG. 5 illustrates a relationship between the speed control characteristics shown in FIG. 4 and the deviation characteristics of the read/write device.
Figure 15:
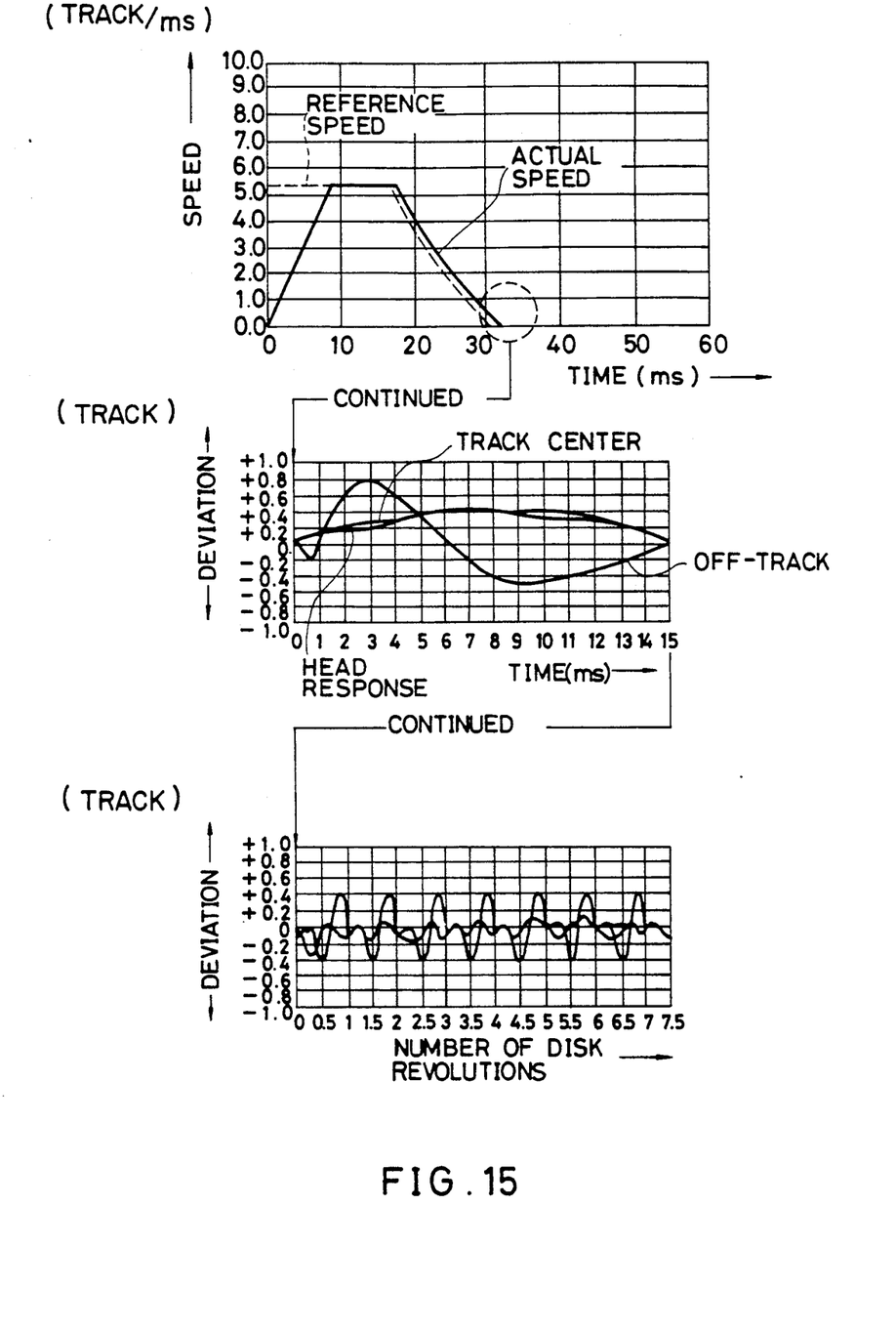
FIG. 15 shows the characteristics illustrating the disadvantages of a conventional system.

As appreciated from the foregoing detailed description of this invention, the deviation of the read/write device from the track center at the time of changing from the seek mode to the tracking control mode can be considerably reduced, as specifically shown in FIG. 5 and FIG. 15, where vertical scales are enlarged ten times for the off-track curves, thus making an overshoot at the time of settling small and the settling time short.

We claim:

1. In a position control system for a read/write device for positioning the read/write device at a particular track of a disk having a tracking pattern in the recording medium of the disk, said system having transportation means for transporting the read/write device to a target track and a control loop containing a filter whose gain is adapted to be set at a predetermined value at a plurality of frequencies, the improvement comprising:

position control means for controlling the position of said read/write device to track the target track;

switching means for switching between said transportation means and said position control means for controlling movement of the read/write device in either a seek mode or a position control mode, respectively;

means for detecting a rotational phase of the disk during sampling periods according to a sampling rate;

means for storing internal variables of the filter that define the gain of the filter for one rotation of the disk in relation to the rotational phase detected at each sampling period; and means for reading out an internal variable at a corresponding rotational phase of the disk, subsequent to said switching means switching from said transportation means to said position control means, said means for reading choosing among the internal variables of the filter previously stored in said means for storing responsive to the rotational phase at the time said switching means switches from said transportation means to said position control means so as to set the internal variable read out as an initial value of said filter to start the operation of said filter.

2. In a position control system for a read/write device for positioning the read/write device at a particular track of a disk having a tracking pattern in the recording medium of the disk, said system having transportation means for transporting the read/write device to a target track and a control loop containing a filter whose gain is adapted to be set at a predetermined value at a plurality of frequencies, the improvement comprising:

position control means for controlling the position of said read/write device to track the target track;

switching means for switching between said transportation means and said position control means for controlling movement of the read/write device in either a seek mode or a position control mode, respectively;

means for detecting a rotational phase of the disk during sampling periods according to a sampling rate;

means for storing internal variables of the filter that define the gain of the filter for one rotation of the disk in relation to the rotational phase detected at each sampling period; and means for applying, after said switching means switches from the transportation means to said position control means, a particular internal variable stored in said means for storing to said filter.

3. A position control system for a read/write device for positioning the read/write device at a particular track of a disk having a tracking pattern in the recording medium, comprising:

an actuator having means for detecting a transporting speed of said read/write device;

speed control means for causing the speed detected by said speed detecting means to follow a reference speed so as to transport the read/write device to a target track;

position control means for controlling the position of said read/write device to track the target track;

means for switching between said speed control means and said position control means;

means for detecting a rotational phase of the disk;

means for storing speed variation data of said read/write device in the radial direction of a track of said disk associated with the rotational phase of the disk, said speed variation data being obtained by said means for detecting during one rotation of said disk while said positioning means positions said read/write device at a specific track within a predetermined area of said disk; and means for adjusting the reference speed of speed control means in accordance with said speed variation data stored in said storage means corresponding to the rotational phase of the disk.

* * * * *